March 19, 1963  C. HERON  3,081,738
CALF AND LAMB FEEDER
Filed Sept. 5, 1961
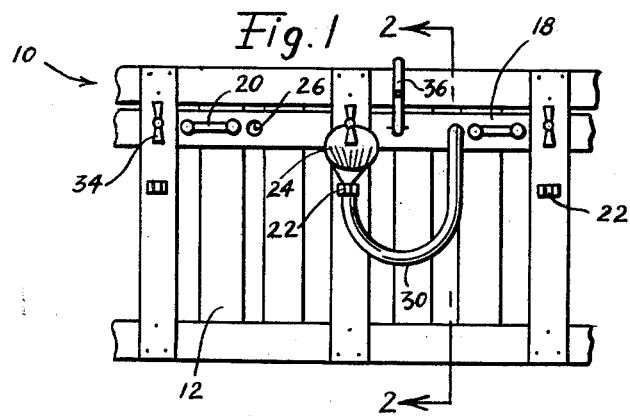
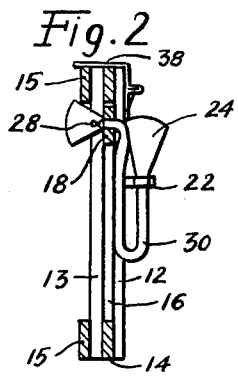
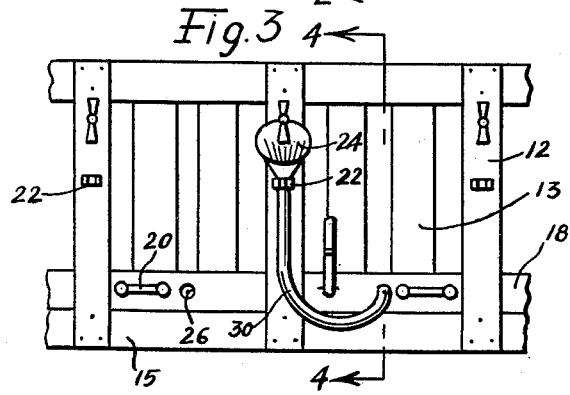
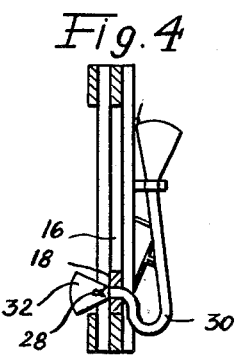
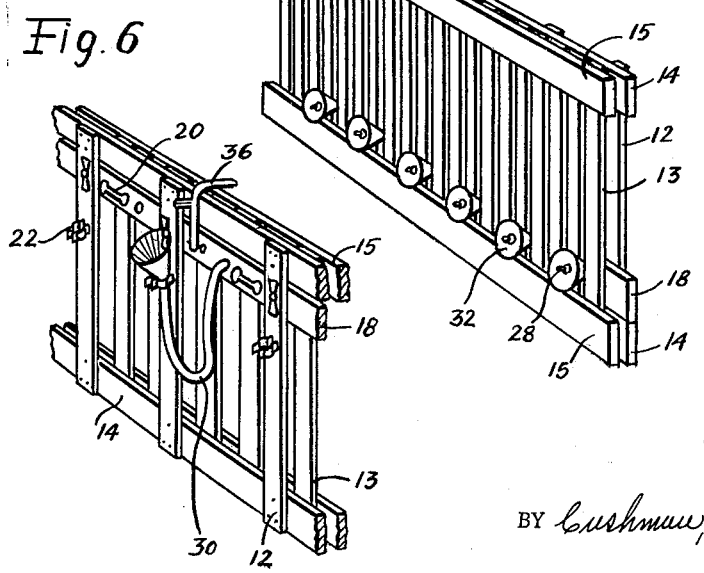
INVENTOR
Claude Heron
BY Cushman, Darby & Cushman
ATTORNEYS

3,081,738
CALF AND LAMB FEEDER
Claude Heron, Faith, S. Dak.
Filed Sept. 5, 1961, Ser. No. 135,884
4 Claims. (Cl. 119—71)

This invention relates generally to an improved apparatus for feeding livestock and more particularly is concerned with novel structure for feeding a plurality of calves and lambs which may be withdrawn from the reach of the animals when the feeding period has terminated.

Various types of apparatus have been employed in feeding livestock prior to this time. Very often a pail having a nipple mounted adjacent its base rim was suspended from a wall or fence at a height which would permit easy access by the animal. Subsequent to feeding, it was necessary to remove the pail. Pails have also been used employing a plurality of such nipples but it was likewise necessary to remove the pail after feeding time. Still other feeders employing a trough having nipples extending downwardly therefrom at a height which suited the animals to be fed, but these devices being large and cumbersome could not be easily removed and therefore after feeding time it was necessary to remove the animals from the vicinity of the feeder.

The invention herein described allows one or more animals to be fed, and after the feeding period has passed, the nipples could be raised out of reach of the animals without the necessity of removing the whole device. The feeding device herein described comprises a structure mounting one or more buckets to be filled with the feeding solution. Also mounted on the structure is a feeding board which is slidable in the supporting structure and which has an opening passing through which is adapted to receive a feeding nipple. The bottom of the bucket is connected to the feeding nipple by means of a flexible tube or hose. When not in use the feeding board is held a substantial height above the ground by means of a hook arrangement. At feeding time, the bucket supported on the main structure is filled with the feeding solution, the hook means is released, and the feeding board with the feeding nipples mounted thereon is lowered to a position which is easily accessible to the animals.

Accordingly, it is an object of this invention to provide a novel livestock feeder which allows the feeding means to be lowered for easy access by an animal to be fed, and further allows the feeding means to be raised out of such feeding position when the feeding period has terminated.

Another object of this invention is the provision of structure supporting at least one feed container, a feeding board slidable in the supporting structure, at least one feeding means mounted in the feeding board, and flexible tube means connecting the container to the feeding means.

Still another object of this invention is to provide a hook arrangement mounted on the feeding board and engageable with the supporting structure for holding the board in a first position, the hook being further attached to be released thereby enabling the board to assume a second position for feeding.

Yet another object of this invention is the provision of a feeding board mounted for sliding movement from a first raised position to a second lowered position and including at least one opening passing therethrough for receiving a feeding means and a flexible tube means connected thereto.

Still a further object of this invention is the provision of a feeding board slidable from a first raised position to a second lowered position having handle means secured thereto as an aid in raising and lowering the feeding board.

Other objects and advantages will become more apparent from the more detailed description of the invention which follows, taken together with the accompanying drawings in which:

FIGURE 1 is a rear elevation view of the feeding device which comprises the basis of the present invention in which the feeding means are shown in raised postion;

FIGURE 2 is a section view taken along lines 2—2 of FIGURE 1;

FIGURE 3 is a rear elevation view similar to that shown in FIGURE 1 in which the feeding means are in a lowered position;

FIGURE 4 is a section view taken along lines 4—4 of FIGURE 3;

FIGURE 5 is a perspective view showing the front side of the feeding device and indicating more clearly the nipple feeding means which are in lowered position; and FIGURE 6 is a perspective view of the rear side of the feeding device with a feeding means in raised postion as shown in FIGURES 1 and 2.

Referring now to the drawings, a calf and lamb feeder which forms the basis of the present invention is generally indicated at 10. This may consist of a wood or metal structure as desired. Preferably, the feeder structure comprises a plurality of vertical members indicated at 12 and 13 and horizontal members indicated at 14 and 15 which mount the vertical members. The horizontal members 15 further serve to separate the adjacent vertical members 12 and 13 as shown at 16.

A feeding board 18 has a thickness somewhat less than the separation 16 which allows it to be moved up and down between the adjacent members 12 and 13. Handle members 20 are suitably mounted upon the feeding board 18 at spaced intervals as indicated in FIGURES 1, 3 and 6. By means of these the feeding board 18 may be raised to a position as shown in FIGURES 1 and 6. Mounted to the vertical members 12 by means of spring clamps 22 are buckets 24 which may be of funnel shape as shown in the drawings or any other desirable shape.

A rotatable latch member 34 further serves to rigidly mount each bucket 24 to the vertical member. While the drawings in FIGURES 1, 3 and 6 show only one bucket 24 clamped in position, it is to be understood that when feeding a number of animals at one time, some or all of the clamps 22 would be used to support a like number of buckets 24.

The feeding board 18 also has a number of openings 26 passing therethrough at predetermined intervals along its length, one opening corresponding to each bucket. A feeding nipple 28 is mounted in each opening 26 and a flexible tube or hose 30 connects the bottom of each bucket 24 with each corresponding feeding nipple 28. A funnel-like guard 32 may also be mounted to the forward side of the feeding board 18 surrounding the feeding nipple 28. The purpose of this guard is to hold steady the mouth of the feeding animal, preventing escape of the feeding solution from its mouth as well as to prevent adjacent animals from interfering with each other while feeding.

A hook 36 is pivotally mounted to the feeding board 18 and has a generally horizontal portion 38 which engages the top side of the top horizontal members 14 and 15. A number of these hooks 36 may be located at various intervals along the length of the feeding board and their purpose is to hold the board in the raised position shown in FIGURES 1, 2 and 6. When it is desirable, the hook 36 may be pivoted out of engagement with the horizontal members 14 and 15, thereby allowing the feeding board 18 to be lowered to the position shown in FIGURES 3 and 4. If a number of these hooks 36 is employed at various intervals along a length of the feeding board, it might be advisable to provide some connecting means between each of the hooks such that removal of one from engagement with the horizontal members will result in removal of all therefrom.

The operation of the feeding device described herein is easily performed and consists of the following steps. One or more of the buckets 24 which are preferably of funnel shape for purposes of easy filling are filled with the feeding solution to be fed the animals. Each bucket may be formed with suitable indicia means to indicate the amount of liquid which has been poured therein at the various levels so as to assure that each animal will be fed the proper amount. During this step, the feeding board 18 is held in the raised position as shown in FIGURES 1, 2 and 6 by means of the hook 36 engaging the upper side of the upper horizontal members 14 and 15. When each of the buckets 24 mounted on the feeder 10 have been filled with the desired amount of feed, the latch member 34 may be pivoted out of engagement with the members 14 and 15, and the feeding board 18 lowered to the position shown in FIGURES 3 and 4. When the feed board 18 has been lowered to this position, the feeding nipples 28 surrounded by the funnel-like guards 32 appear at the front of the feeder in the manner shown in FIGURE 5 and are ready to receive the animals for feeding. Upon termination of the feeding period, the feeding board 18 is again raised by means of the handle numbers 20 and is held in that position by means of the hook 36 engaging the upper horizontal members 14 and 15. The feeding means are thus raised to prevent the animals from chewing on the nipples thereby causing harm to them and also as indication to the animals that the feeding period is at an end.

While only one form of the invention has been shown and described, this is not intended to be a limitation thereof, as other variations may be apparent to one skilled in the art, but is only to be limited by the scope of the following claims:

What is claimed is:

1. A calf and lamb feeder comprising stationary support, a movable support, a plurality of individual feeding solution receptacles and a plurality of individual feeding solution dispensers; said stationary support comprising a plurality of substantially vertical, spaced forward slats laterally spaced from and paired with a plurality of substantially vertical, spaced rearward slats and upper and lower substantially horizontal members secured to said slats defining a substantially rectangular opening through the stationary support between each pair of forward and rearward slats; said movable support comprising a board of substantially the same length as said stationary support horizontal members, said board being horizontally positioned within the space between the forward and rearward slats of the stationary support and adapted to slide vertically between a raised and a lowered position in said space; said individual feeding solution receptacles comprising a plurality of buckets corresponding to the number of rectangular openings between forward and rearward pairs of slats, said buckets being removably mounted on the rearward portion of said stationary support near the upper ends of said rectangular openings; said individual feeding solution dispensers each comprising a flexible tube having a nipple surrounded by a funnel-like guard secured to a first end thereof, the second end of each tube being secured to and communicated with a feeding solution receptacle, said first end of each tube extending through a rectangular opening so that said nipples protrude beyond said forward slats, said first end of each tube being supported by said movable support, said nipples all being moved from a lowered feeding position to a raised non-feeding position by the vertical movement of said movable support.

2. A calf and lamb feeder as set forth in claim 1 wherein the first end of each tube passes through a hole formed in said movable support at a point intermediate each double pair of forward and rearward slats, said guard surrounded nipples being thereby flexibly supported on the forward surface of the movable support.

3. A calf and lamb feeder comprising a stationary support, a movable support, a plurality of individual feeding solution receptacles and a plurality of individual feeding solution dispensers; said movable support mounted within said stationary support, said receptacles mounted on said stationary support; said individual feeding solution dispensers being carried by said movable support and connected to said individual feeding solution receptacles, said movable support being vertically slidable with respect to the stationary support from a lowered position wherein each dispenser is available to feed an animal from an individual supply of feeding solution in the associated receptacle to a raised position wherein each dispenser is inaccessible for feeding.

4. A calf and lamb feeder as in claim 3 wherein each dispenser comprises a tube having a nipple secured to one end thereof and a funnel-like guard surrounding said nipple so as to guide and protect the mouth of the feeding animal and exclude other animals.

References Cited in the file of this patent
UNITED STATES PATENTS

| 456,213 | Boll et al. | July 21, 1891 |
| 668,062 | Smith | Feb. 12, 1901 |
| 966,645 | Berry et al. | Aug. 9, 1910 |

FOREIGN PATENTS

| 319,367 | France | July 21, 1902 |